UNITED STATES PATENT OFFICE.

WILLIAM DODGE HORNE, OF YONKERS, NEW YORK.

PROCESS OF PURIFYING SOLUTIONS.

1,150,194.   Specification of Letters Patent.   Patented Aug. 17, 1915.

No Drawing. Application filed April 4, 1907. Serial No. 366,272.

*To all whom it may concern:*

Be it known that I, WILLIAM DODGE HORNE, a citizen of the United States, residing at Yonkers, in the county of Westchester and State of New York, have invented certain new and useful Improvements in Processes of Purifying Solutions, of which the following is a full, clear, and exact specification.

This invention relates to a process of purifying solutions containing impurities which are not removed by the ordinary methods of precipitation or filtration. More particularly the invention comprises a process enabling the purification by filtration of solutions containing substances not ordinarily removable by filtration, either because of not being precipitated by the usual reagents, or because such precipitates as may theoretically or actually be formed will be so minute in quantity or of such fine character as to pass through the filter, or because of re-solution of the precipitates theoretically formed. In processes heretofore known for purifying liquids, and more especially raw washings, syrups, bag sweet waters, and the sweet water obtained from the bone black filters, &c., in the refining of sugar, it has not been practicable to entirely remove the substances which give the dark color and a disagreeable taste, and such solutions containing below a certain percentage of solids have been thrown away, even though containing a considerable portion of saccharine substance. The invention is also applicable to syrups from centrifugals and other low products, obtained in sugar refining, as well as to various solutions occurring in other branches of industrial chemistry, as will be hereinafter fully explained.

In the process of sugar refining, the dark sugar solution is clarified by being passed through a bone black or char filter, which takes up the impurities and the solution issues colorless, or nearly so. After the char or bone black has absorbed all of the impurities which it can, any further solution passed through will not be changed. This point can be determined by the color and purity of the filtered solution. After the sugar solution is cut off, the char is treated with hot water, and the resulting solutions, (the sweet water) classified according to density, for further treatment,—certain of these, containing the smallest proportion of sugar to the amount of other solids, being thrown away because of having a dark color and an objectionable taste. I have discovered that this is due principally to the presence of dissolved iron salts, which oxidize and turn dark, as well as to other mineral salts, which are slower than sugar, to be taken up by the hot water from the char, so that in general, the last sweet water has the most objectionable taste and darkest color due to greater relative concentration of salts and organic impurities, but still having a considerable proportion of saccharine matter, of no present value because of the preponderance of objectionable mineral salts it contains.

I have discovered that the iron salts to which the bitter taste and the color are largely due, can be precipitated so as to be filtered out, by causing to combine with a solution containing such salts, (preferably to the sweet water or low syrup, because of the concentration of iron salts therein) a sulfid or polysulfid of a base, (such as sodium sulfid or ammonium sulfid) or hydrosulfuric acid, whereby the iron, and certain other impurities, such as aluminium, are precipitated according to the general equation:—

$$FeCl_2 + Na_2S = FeS + 2NaCl,$$

or

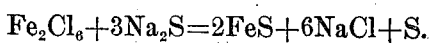

$$Fe_2Cl_6 + 3Na_2S = 2FeS + 6NaCl + S.$$

Preferably, the solution should be neutral or alkaline, and if strongly acid, should be neutralized in whole or in part before treatment with the preferably soluble sulfid above given. Where much iron is present, a good precipitation takes place by sulfid alone, and the iron may be removed by filtration, but where less iron is present, the precipitate of iron sulfid tends to remain in extremely minute particles in suspension, imparting a green color to the solution and difficult to filter off. The iron is, however, thrown permanently out of solution by the described treatment, but needs to be put in such form as to be caught by the filter. With some solutions, further treatment of the precipitate to enable it to be filtered clear may not be necessary, but where the precipitated iron shows by its color, and is difficult to filter off, further treatment is desirable. This may be accomplished by putting in the solution some precipitate which will agglomerate the suspended particles of precipitated insoluble iron compound, to form flocs of a size and character to be caught by the filter. This precipitate may be added ready formed to the solution, as for instance, cream of alumina $Al_2(OH)_6 + Aq$, or clay, either at the time of adding the sulfid, before, or later, with which the iron precipitate will become entangled, so that it may be held by the filter. Also instead of adding cream of alumina, I may secure the same result in a solution containing aluminium by precipitating this aluminium in the form of flocculent aluminium hydrate $(Al_2(OH)_6)$ with any suitable reagent, and, upon adding the reagent to precipitate the iron, the precipitated iron sulfid will be entangled with the flocculent aluminium precipitate and retained by the filter. Other flocculating substances or precipitates, such as kaolin or fullers' earth, albumin, carbonate of lime, silicate of aluminium, may be used for the same purpose.

More especially in connection with sugar solutions, washings, etc., which may contain lime and other salts in addition to iron, the invention contemplates the precipitation of such salts to entangle the iron, as well as to purify the solution of such salts. Many of these salts, including those of iron and calcium, can be precipitated by a soluble phosphate, such as sodium phosphate (hydroisodic phosphate,—$Na_2HPO_4.12H_2O$). Also phosphate of lime, and various other salts may be used. I have discovered that the iron theoretically precipitated by a phosphate tends to redissolve in a sugar solution, and in greater proportion, as the sugar content increases, so that several times the theoretical amount of phosphate may be necessary to hold the iron, or the largest part of it, during filtration. If, however, the iron be precipitated as insoluble sulfid, there is no tendency to redissolve, and less phosphate will be required for the precipitation of the other salts. This treatment of the other salts with a phosphate, in connection with the treatment of the iron with a sulfid, forms two precipitates. The insoluble, but finely divided or suspended iron precipitate will be caught and retained by the coarser precipitate formed by the phosphate, and will be held by the filter or other separating device, so that the resulting liquid will be clear and free of the iron which imparts the objectionable color and taste. Instead of sodium sulfid, ammonium sulfid $(NH_4)_2S$, or some other sulfid of a base as sulfureted hydrogen may be used, and to accelerate the precipitation, the solutions may be heated. This process thus renders a lower grade of sweet water capable of use, than has heretofore been considered practicable, while higher grade solutions will be capable of more advantageous use in the processes of manufacture or refining, and a very much better residual commercial syrup or molasses will result.

The process herein described of removing finely divided precipitates, by entangling such precipitates with some other precipitate, formed therein simultaneously with the formation of the finely divided precipitate, is applicable to other parts of sugar manufacture than the treatment of sweet water washings, &c., and to various kinds of sugar, as well as to other arts. Furthermore, the removal of finely divided precipitated iron from solution, and also the color, by means of a carrying substance, such as another precipitate, will be advantageous in other processes than the particular one herein described. In some cases where a small amount of iron is present, the green color appears upon the addition of the sulfid, and only precipitates after a long time, but in the presence of a suitable second precipitate the green color disappears immediately.

Having thus described my invention, I declare that what I claim as new and desire to secure by Letters Patent, is,—

1. The process of treating a sugar solution which consists in suspending in said solution a precipitate agglomerating substance, and adding to said solution a precipitant forming a precipitate readily filtered or decanted together with said agglomerating substance before re-solution of the precipitate.

2. The process of treating a sugar solution containing iron, which consists in suspending in said solution a precipitate agglomerating substance, and adding to said solution a precipitant of iron forming a precipitate of iron readily filtered or decanted together with said agglomerating substance before re-solution of the precipitate.

3. The process of treating a sugar solution which consists in adding a phosphate and a sulfid, and separating the resulting precipitate from the sugar solution.

4. The process of extracting salts from a sugar solution which consists in adding to the solution a soluble phosphate and a soluble sulfid.

5. The process of removing iron coloring matter from a sugar solution which consists in precipitating said iron coloring matter and entangling said precipitate with a second substance in suspension in the solution.

6. The process of removing iron coloring matter from a sugar solution which consists in precipitating said iron coloring matter and entangling said precipitate with a second precipitate formed from said solution.

In testimony whereof I affix my signature, in presence of two witnesses.

WILLIAM DODGE HORNE.

Witnesses:
JULIAN S. WOOSTER,
GEO. A. HOFFMAN.